(12) United States Patent
Ames et al.

(10) Patent No.: US 11,221,392 B2
(45) Date of Patent: Jan. 11, 2022

(54) LIDAR OBJECT DETECTION AND DATA COMMUNICATIONS

(71) Applicant: GM GLOBAL TECHNOLOGY OPERATIONS LLC, Detroit, MI (US)

(72) Inventors: Michael Ames, Lake Orion, MI (US); David H. Clifford, Royal Oak, MI (US); Andrew J. Lingg, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 601 days.

(21) Appl. No.: 16/050,010

(22) Filed: Jul. 31, 2018

(65) Prior Publication Data

US 2020/0041609 A1 Feb. 6, 2020

(51) Int. Cl.
*G01S 7/00* (2006.01)
*G01S 17/04* (2020.01)

(52) U.S. Cl.
CPC .............. *G01S 7/006* (2013.01); *G01S 17/04* (2020.01)

(58) Field of Classification Search
CPC .... G01S 17/04; G01S 17/006; H04B 10/1143
USPC ........................................................ 356/5.01
See application file for complete search history.

(56) References Cited

U.S. PATENT DOCUMENTS

| | | | | |
|---|---|---|---|---|
| 5,835,203 A * | 11/1998 | Ogura | .................... | G01S 17/931 356/5.01 |
| 8,218,024 B2 * | 7/2012 | Kawata | .................... | G01S 17/86 348/222.1 |
| 9,734,699 B2 * | 8/2017 | Wassef | .................... | B60Q 9/008 |
| 9,963,106 B1 * | 5/2018 | Ricci | .................... | B60R 25/2018 |
| 10,082,562 B1 * | 9/2018 | Abari | .................... | G01S 13/343 |
| 10,120,076 B2 * | 11/2018 | Scheim | ................. | G01S 17/931 |
| 10,175,340 B1 * | 1/2019 | Abari | ....................... | G01S 7/006 |
| 10,279,734 B2 * | 5/2019 | Bertollini | .............. | B60W 30/09 |
| 10,281,581 B2 * | 5/2019 | Lipson | ............... | H04B 10/1123 |
| 10,306,430 B1 * | 5/2019 | Abari | ................... | G05D 1/0055 |
| 10,611,369 B2 * | 4/2020 | Cinpinski | ........... | B60R 21/0134 |
| 10,935,640 B2 * | 3/2021 | Jackson | ................. | G01S 17/87 |
| 2008/0170142 A1 * | 7/2008 | Kawata | .................... | G01S 17/86 348/294 |
| 2015/0088373 A1 * | 3/2015 | Wilkins | ............... | G05D 1/0234 701/36 |
| 2016/0327635 A1 * | 11/2016 | Scheim | ................. | G01S 7/4815 |
| 2016/0327648 A1 * | 11/2016 | Lipson | .................... | G01S 17/74 |
| 2016/0358453 A1 * | 12/2016 | Wassef | ..................... | G08B 6/00 |
| 2018/0126951 A1 * | 5/2018 | Ricci | ..................... | B60W 30/14 |
| 2018/0154906 A1 * | 6/2018 | Dudar | ................. | B60R 21/0136 |
| 2018/0361918 A1 * | 12/2018 | Bertollini | ............... | B60Q 5/005 |
| 2019/0232954 A1 * | 8/2019 | Cinpinski | ............. | B60W 40/10 |
| 2019/0331774 A1 * | 10/2019 | Jackson | ............... | G01S 7/4863 |
| 2020/0249353 A1 * | 8/2020 | Di Cicco | ............. | G01S 17/894 |

* cited by examiner

*Primary Examiner* — James R Hulka

(57) ABSTRACT

A system and method for communicating data using lidar, the method being carried out by a lidar communication system, the method including: activating a data communication mode of a lidar unit; preparing data for communication using lidar; after activating the data communication mode, emitting a plurality of light pulses using the lidar unit, wherein the plurality of light pulses are emitted in a manner so as to convey the prepared data to an external lidar communication device; and receiving an acknowledgment message, wherein the acknowledgment message indicates receipt of the prepared data at the external lidar communication device.

19 Claims, 4 Drawing Sheets

LIDAR OBJECT DETECTION AND DATA COMMUNICATIONS

INTRODUCTION

The present invention relates to using lidar for object detection and data communications.

Vehicles include hardware and software capable of obtaining and processing various information. In some scenarios, this information is communicated to a remote server and used for various purposes. The amount of information can be large in some instances.

SUMMARY

According to one aspect of the invention, there is provided a method of communicating data using lidar, the method being carried out by a lidar communication system, the method including: activating a data communication mode of a lidar unit; preparing data for communication using lidar; after activating the data communication mode, emitting a plurality of light pulses using the lidar unit, wherein the plurality of light pulses are emitted in a manner so as to convey the prepared data to an external lidar communication device; and receiving an acknowledgment message, wherein the acknowledgment message indicates receipt of the prepared data at the external lidar communication device.

According to various embodiments, this method may further include any one of the following features or any technically-feasible combination of some or all of these features:
- operating the lidar unit in an object detection mode, wherein the lidar unit, when operating in the object detection mode, emits lidar signals using a scan mode;
- the lidar communication system is a vehicle lidar communication system that is installed into a vehicle as a part of vehicle electronics of the vehicle;
- the preparing step is carried out by a data communication controller, and wherein the prepared data is sent to the lidar unit via a communications bus of the vehicle electronics;
- the activation of the data communication mode includes changing a type of emission of the lidar from a scan mode to a fixed vector mode;
- the data communication mode is an emergency broadcast mode, and wherein the activation of the data communication mode includes changing a type of emission of the lidar from a scan mode to a slow scan mode;
- the lidar unit continuously emits the plurality of light pulses until the acknowledgment message is received, and wherein the plurality of light pulses convey an emergency message;
- the external data communication device is another vehicle;
- the external lidar communication device sends the acknowledgment message to the lidar communication system via backchannel communications;
- the external lidar communication device sends the acknowledgment message to the lidar communication system via a download lidar communication channel that is established between a lidar emitter of the external lidar communication device and a lidar receiver of the lidar unit; and/or
- the lidar communication system continuously sends the prepared data using the plurality of light pulses until the acknowledgment message is received.

According to another aspect of the invention, there is provided a method of communicating data using lidar, the method being carried out by a lidar communication system that is installed in a vehicle as a part of vehicle electronics of the vehicle, the method including: operating a lidar unit in an object detection mode; determining to operate the lidar unit in a data communication mode; activating the data communication mode of a lidar unit; after activating the data communication mode, emitting data from the lidar unit using a plurality of light pulses over an upload lidar communication channel to an external lidar communication device; and receiving an acknowledgment message, wherein the acknowledgment message indicates receipt of the emitted data at the external lidar communication device.

According to various embodiments, this method may further include any one of the following features or any technically-feasible combination of some or all of these features:
- the plurality of light pulses are modulated by the lidar unit according to the data;
- the plurality of light pulses are modulated using amplitude modulation techniques, pulse modulation techniques, and/or frequency modulation techniques;
- the upload lidar communication channel is secured using a handshake or other authentication techniques; and/or
- it is determined to operate the lidar unit in the data communication mode when the vehicle lidar communication system detects the presence of the external lidar communication device.

According to another aspect of the invention, there is provided a vehicle lidar communication system, including: a processor and memory; a lidar unit that includes a lidar emitter and a lidar receiver; and a data communication controller that is communicatively coupled to the lidar unit; wherein the memory includes computer instructions that, when executed by the processor, cause the vehicle lidar communication system to: activate a data communication mode of the lidar unit; prepare data for communication using lidar; after activating the data communication mode, emit a plurality of light pulses using the lidar emitter, wherein the plurality of light pulses are emitted in a manner so as to convey the prepared data to an external lidar communication device; and receive an acknowledgment message, wherein the acknowledgment message indicates receipt of the prepared data at the external lidar communication device.

According to various embodiments, this vehicle lidar communication system may further include any one of the following features or any technically-feasible combination of some or all of these features:
- a wireless communications device that includes wireless communication circuitry, a processor, and memory;
- the lidar unit includes a lidar pulse controller that controls emission of the plurality of light pulses; and/or
- the computer instructions, when executed, further cause the vehicle lidar communication system to direct the plurality of light pulses toward the external lidar communication device when emitting the plurality of light pulses.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables communicating data using a lidar unit to an external lidar receiver. Lidar can be used to obtain spatial information regarding a target area through emitting light pulses and receiving the reflected light pulses at a lidar receiver (e.g., a photodetector). The time of flight of a light pulse (i.e., the time between emission and reception after reflection) informs the lidar unit of a range at which the detected object (or the object causing the reflection) is located. The angle of emission (e.g., azimuth and/or elevation angle) can inform the lidar unit of the direction of the object. Using this information objects can be detected and, operating a lidar unit in such a mode, can be referred to as an object detection mode. However, the lidar unit discussed herein can also be operated in a data communication mode.

The data communication mode is a mode of operating the lidar in which data is communicated through use of the lidar signals (i.e., emitted light pulses from the lidar unit). A direct line of sight can be established or detected between the lidar unit and an external lidar communication device, which can be another lidar unit or other light detector. The lidar unit then uses a light emitter (or lidar emitter) to send lidar signals (or light pulses) in accordance with data. This can include modulating the data over the light signals using frequency modulation techniques, amplitude modulation techniques, and/or other modulation techniques. In another example, the lidar unit can emit the light pulses according to a sequence representing the data, which can include varying the intervals between the light pulses and/or varying the pulse width of the light pulses. Other modulation and/or data communication techniques applicable to data-carrying light applications can be used as well.

Figure 1:
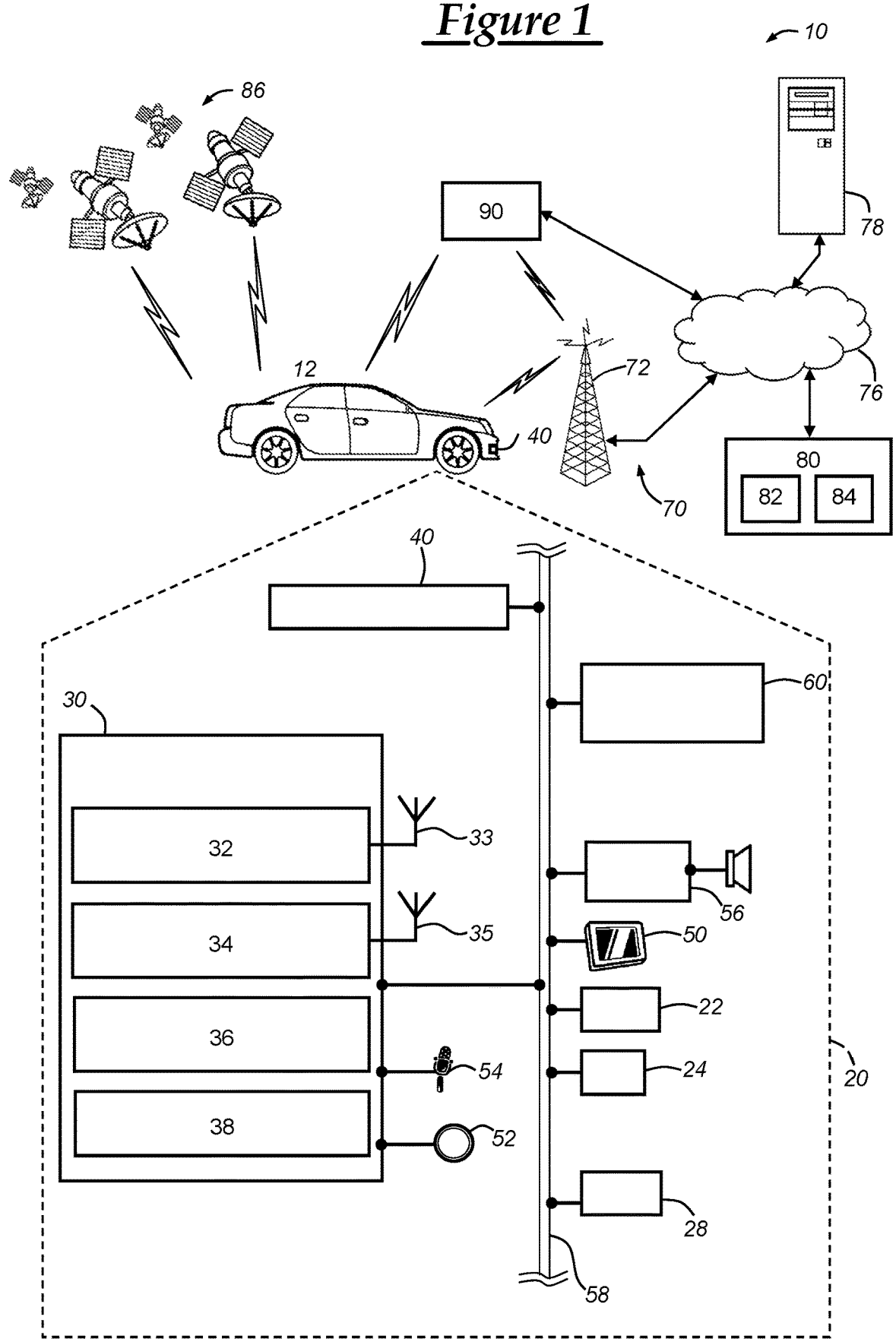
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12 that includes lidar unit 40 (and other vehicle electronics 20), one or more wireless carrier systems 70, a land communications network 76, a computer or server 78, a vehicle backend services facility 80, a constellation of global navigation satellite system (GNSS) satellites 86, and an external lidar communication device 90. It should be understood that the disclosed method can be used with any number of different systems and is not specifically limited to the operating environment shown here. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft including unmanned aerial vehicles (UAVs), etc., can also be used. Some of the vehicle electronics 20 are shown generally in FIG. 1 and includes a global navigation satellite system (GNSS) receiver 22, a body control module or unit (BCM) 24, other vehicle system modules (VSMs) 28, a wireless communications device 30, a lidar unit 40, vehicle-user interfaces 50-56, and onboard computer 60. Some or all of the different vehicle electronics may be connected for communication with each other via one or more communication busses, such as communications bus 58. The communications bus 58 provides the vehicle electronics with network connections using one or more network protocols and can use a serial data communication architecture. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few. In other embodiments, a wireless communications network that uses short-range wireless communications (SRWC) to communicate with one or more VSMs of the vehicle can be used. In one embodiment, the vehicle 12 can use a combination of a hardwired communications bus 58 and SRWCs. The SRWCs can be carried out using the wireless communications device 30, for example.

The vehicle 12 can include numerous vehicle system modules (VSMs) as part of vehicle electronics 20, such as the GNSS receiver 22, BCM 24, wireless communications device 30, lidar unit 40, vehicle-user interfaces 50-56, and onboard computer 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is preferably connected by communications bus 58 to the other VSMs including the wireless communications device 30. Moreover, each of the VSMs can include and/or be communicatively coupled to suitable hardware that enables intra-vehicle communications to be carried out over the communications bus 58; such hardware can include, for example, bus interface connectors and/or modems. One or more VSMs 28 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives radio signals from a constellation of GNSS satellites 86. The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 86. And, in another example, GNSS receiver 22 can be a BDS receiver that receives a plurality of GNSS (or BDS) signals from a constellation of GNSS (or BDS) satellites 86. The GNSS received can determine a current vehicle location based on reception of a plurality of GNSS signals from the constellation of GNSS satellites 86. The vehicle location information can then be communicated to the wireless communications device 30, or other VSM, such as the onboard computer 60. In one embodiment, the wireless communications module 30 and/or a telematics unit can be integrated with the GNSS receiver 22 so that, for example, the GNSS receiver 22 and the wireless communications device 30 (or the telematics unit) are directly connected to one another as opposed to being connected via communications bus 58. In other embodiments, the GNSS receiver 22 is a separate, standalone module.

Body control module (BCM) 24 can be used to control various VSMs of the vehicle, as well as obtain information concerning the VSMs, including their present state or status, as well as sensor information. The BCM 24 is shown in the exemplary embodiment of FIG. 1 as being electrically coupled to the communication bus 58. In some embodiments, the BCM 24 may be integrated with or part of a center stack module (CSM) and/or integrated with wireless communications device 30 or the onboard computer 60. Or, the BCM may be a separate device that is connected to other VSMs via bus 58. The BCM 24 can include a processor and/or memory, which can be similar to processor 36 and memory 38 of wireless communications device 30, as discussed below. The BCM 24 may communicate with wireless device 30 and/or one or more vehicle system modules, such as an engine control module (ECM), audio system 56, or other VSMs 28; in some embodiments, the BCM 24 can communicate with these modules via the communications bus 58. Software stored in the memory and executable by the processor enables the BCM to direct one or more vehicle functions or operations including, for example, controlling central locking, air conditioning, power mirrors, controlling the vehicle primary mover (e.g., engine, primary propulsion system), and/or controlling various other vehicle modules. In one embodiment, the BCM 24 can be used (at least in part) to detect a vehicle event, such as a power on state or a power off state, based on one or more onboard vehicle sensor readings, as discussed more below.

As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. Moreover, the powered on state can include instances in which the auxiliary electronics of the vehicle is supplied with electrical power.

Figure 2:
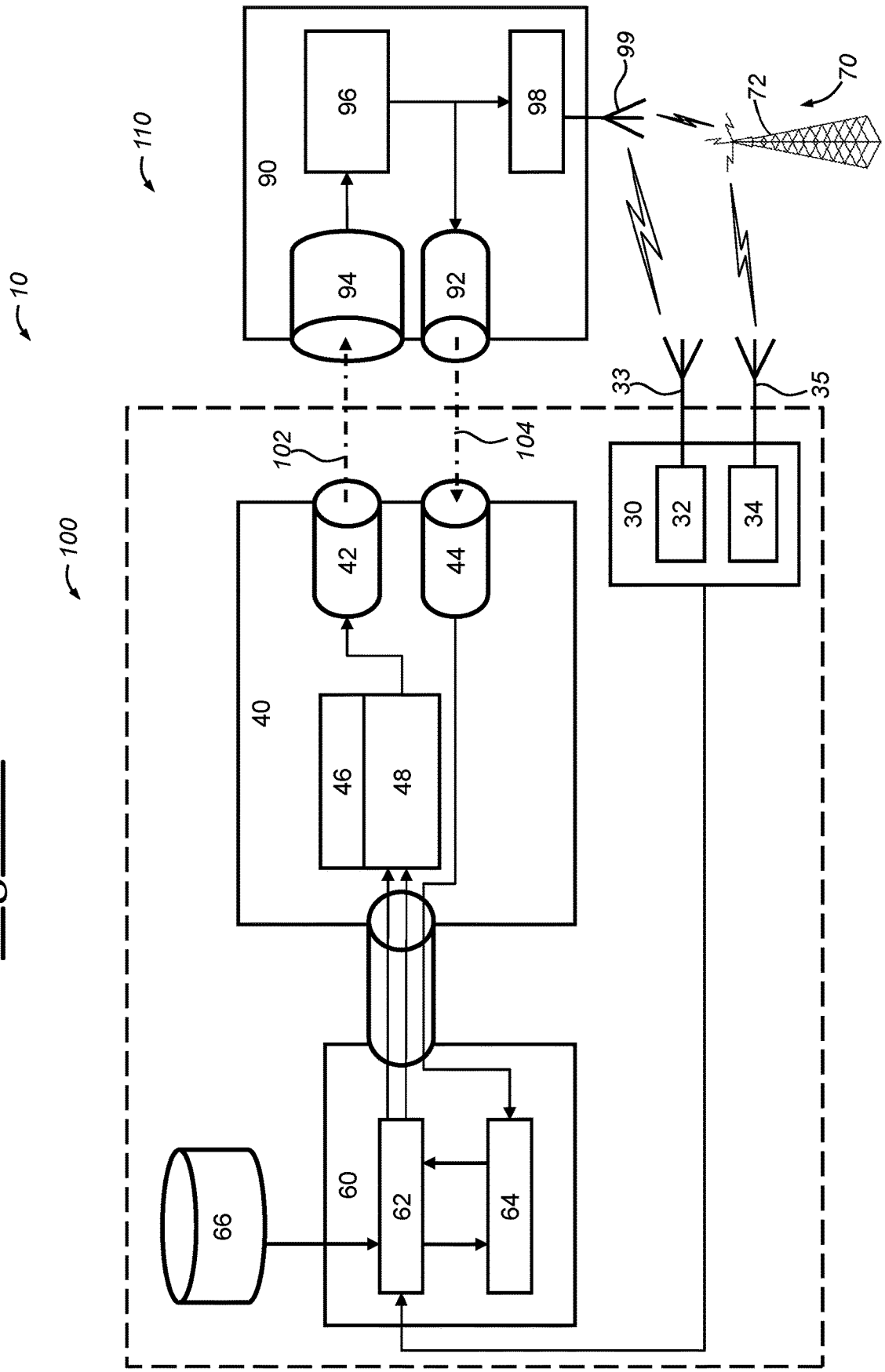
FIG. 2 is a block diagram depicting a detailed embodiment of the communication system of FIG. 1.

Wireless communications device 30 is capable of communicating data via short-range wireless communications (SRWC) through use of SRWC circuit 32 and/or via cellular network communications through use of a cellular chipset 34, as depicted in the illustrated embodiment. The wireless communications device 30 can provide an interface between various VSMs of the vehicle 12 and one or more devices external to the vehicle 12, such as one or more networks or systems at remote facility 80 or external lidar communication system 110 (FIG. 2). This enables the vehicle to communicate data or information with remote systems, such as remote facility 80 or the external lidar communication device 90.

In at least one embodiment, the wireless communications device 30 can also function as a central vehicle computer that can be used to carry out various vehicle tasks. In such embodiments, the wireless communications device 30 can be integrated with the onboard computer 60 such that the onboard computer 60 and the device 30 are a single module. Or, the wireless communications device 30 can be a separate central computer for the vehicle 12 in addition to the onboard computer 60. Also, the wireless communications device can be incorporated with or a part of other VSMs, such as a center stack module (CSM), body control module (BCM) 24, an infotainment module, a head unit, a telematics unit, and/or a gateway module. In some embodiments, the wireless communications device 30 is a standalone module, and can be implemented as an OEM-installed (embedded) or aftermarket device that is installed in the vehicle.

In the illustrated embodiment, wireless communications device 30 includes the SRWC circuit 32, the cellular chipset 34, a processor 36, memory 38, and antennas 33 and 35. The wireless communications device 30 can be configured to communicate wirelessly according to one or more short-range wireless communications (SRWC) such as any of the Wi-Fi™, WiMAX™, Wi-Fi™ Direct, other IEEE 802.11 protocols, ZigBee™ Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. And, in some embodiments, the wireless communications device 30 can be configured to communicate using IEEE 802.11p such that the vehicle can carry out vehicle-to-vehicle (V2V) communications, or vehicle-to-infrastructure (V2I) communications with infrastructure systems or devices, such as the remote facility 80 or the external lidar communication device 90. And, in other embodiments, other protocols can be used for V2V or V2I communications. The short-range wireless communication (SRWC) circuitry 32 enables the wireless communications device 30 to transmit and receive SRWC signals, such as BLE signals. The SRWC circuit can allow the device 30 to connect to another SRWC device, such as the external lidar communication device 90. Additionally, in some embodiments, the wireless communications device 30 contains a cellular chipset 34 thereby allowing the device to communicate via one or more cellular protocols, such as those used by cellular carrier system 70. In such a case, the wireless communications device 30 is user equipment (UE) that can be used to in carry out cellular communications via cellular carrier system 70.

Wireless communications device 30 may enable the vehicle 12 to be in communication with one or more local or remote networks (e.g., one or more networks at remote facility 80 or computers 78) via packet-switched data communication. This packet-switched data communication may be carried out through use of a non-vehicle wireless access point or cellular system that is connected to a land network via a router or modem, such as one that is a part of an external lidar communication system 110 (FIG. 2). When used for packet-switched data communication such as TCP/IP, the communications device 30 can be configured with a static Internet Protocol (IP) address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such a scenario, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, in one embodiment, the processor 36 can execute programs or process data to carry out at least a part of the method discussed herein. Memory 38 may include any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. In one embodiment, the wireless communications device 30 also includes a modem for communicating information over the communications bus 58.

Lidar unit 40 is a VSM of the vehicle electronics 20 that includes a lidar emitter and a lidar receiver. The lidar unit 40 can emit non-visible light waves according to an object detection mode, a broadcast communication mode, or an emergency beacon mode. The broadcast communication mode and the emergency beacon mode both include emitting light that carries data from the lidar emitter, which can be modulated over the emitted light (e.g., laser light pulses), as discussed below. The lidar unit 40 operates in the object detection mode to obtain spatial or other physical information regarding one or more objects within the field of view of the lidar unit 40. In many embodiments, the lidar unit 40 emits a plurality of light pulses (e.g., laser light pulses) and receives the reflected light pulses using a lidar receiver. The lidar unit 40 is shown as being mounted (or installed) on the front of the vehicle 12. In such an embodiment, the lidar unit 40 can face an area in front of the vehicle 12 such that the field of view of the lidar unit 40 includes this area. The lidar unit 40 can be positioned in the middle of the front bumper of the vehicle 12, to the side of the front bumper, on the sides of the vehicle 12, on the rear of the vehicle 12 (e.g., a rear bumper), etc. And, although only a single lidar unit 40 is depicted in the illustrated embodiment, the vehicle 12 can include one or more lidar units. Moreover, the lidar data captured by the lidar unit 40 can be represented in a pixel array (or other similar visual representation). The lidar unit 40 can capture static lidar images and/or lidar image or video streams.

In at least one embodiment, the lidar unit 40 includes a processor and memory. The processor can be any type of processor suitable for use with the lidar unit, such as those discussed above with respect to the processor 36 of the wireless communications device 30. Also, the memory of the lidar unit 40 can be any type of suitable memory, such as those discussed above with respect to memory 38 of the wireless communications device 30. The lidar unit 40 can also include or be communicatively coupled to a modem that can modulate and demodulate data communicated over the communications bus 58.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, and/or control input. Audio system 56 provides audio output to a vehicle occupant and can be a dedicated, stand-alone system or part of the primary vehicle audio system. According to one embodiment, audio system 56 is operatively coupled to both vehicle bus 58 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or other display. Various other vehicle-user interfaces can also be utilized, as the interfaces of FIG. 1 are only an example of one particular implementation.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components that may be needed to connect wireless carrier system 70 with the land network 76 or to connect the wireless carrier system with user equipment (UEs, e.g., which can include telematics equipment in vehicle 12, or a secondary communication device 98 of the external lidar communication device 90 (FIG. 2)). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with a vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80 and/or external lidar communication device 90. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), networks providing broadband wireless access (BWA), or any combination thereof.

The computers 78 (only one shown) can be used for one or more purposes, such as for providing backend vehicle services to a plurality of vehicles (such as vehicle 12) and/or for providing other vehicle-related services. The computers 78 can be some of a number of computers accessible via a private or public network such as the Internet. Other such accessible computers 78 can be, for example: a service center computer where diagnostic information and other vehicle data can be uploaded from the vehicle; a client computer used by the vehicle owner or other subscriber for various purposes, such as accessing and/or receiving data communicated from the vehicle (e.g., data communicated using the lidar unit 40), as well as setting up and/or configuring subscriber preferences or controlling vehicle functions; or a vehicle telemetry data server that receives and stores data from a plurality of vehicles.

Vehicle backend services facility 80 is a remote facility, meaning that it is located at a physical location that is located remotely from the vehicle 12. The vehicle backend services facility 80 (or "remote facility 80" for short) may be designed to provide the vehicle electronics 20 with a number of different system back-end functions through use of one or more electronic servers 82. The vehicle backend services facility 80 includes vehicle backend services servers 82 and databases 84, which may be stored on a plurality of memory devices. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. For network communications (e.g., intra-network communications, inter-network communications including Internet connections), the servers can include one or more network interface cards (NICs) (including, for example, wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium; these include different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases at the remote facility 80 can store various information and can include a vehicle operation database that stores information regarding the operation of various vehicles (e.g., vehicle telemetry or sensor data). Also, the remote server 80 can receive can thus act to distribute software (and/or software updates) to the various vehicles including vehicle 12.

With reference to FIG. 2, there is shown a vehicle lidar communication system 100 and an external lidar communication system 110. The vehicle lidar communication system 100 can be incorporated as a part of the vehicle electronics 20, such as is shown in FIG. 1. The external lidar communication system 110 is depicted as being separate from the vehicle 12 and can be part of a stationary computer system (e.g., a home network, electric car charging station, gas station), or may be a part of a mobile computer system (e.g., a vehicle other than vehicle 12, a personal mobile device (e.g., a smartphone, laptop, tablet)). In general, the vehicle lidar communication system 100 includes a lidar unit 40 and a control unit, which is illustrated as the onboard computer 60 in the embodiment presented in FIG. 1. And, the external lidar communication system 110 includes an external lidar communication device 90. The external lidar communication device 90 includes an external lidar receiver 94 and either or both of an external lidar emitter 92 or a secondary communication device 98. The illustrated embodiment of FIG. 2 depicts the external lidar communication device 90 as including both the lidar emitter 92 and the secondary communication device 98, which can be a cellular chipset or SRWC circuitry, for example. The vehicle lidar communication system 100 emits light pulses containing data using a vehicle lidar emitter 42, which are received at the external lidar receiver 94 of the external lidar communication device 90.

In the illustrated embodiment, the external lidar communication device 90 can communicate with (e.g., send data to) the vehicle lidar communication system 100 via the external lidar emitter 92 or via the secondary communication device 98. Communications from the external lidar communication system 110 to the vehicle lidar communication system 100 other than those lidar communication paths 102, 104 are referred to herein as "backchannel communications." In other embodiments, the external lidar communication device 90 can send data to the vehicle lidar communication system 100 using only the download lidar communication channel 104. And, in another embodiment, the external lidar communication device 90 can send data to the vehicle lidar communication system 100 using only backchannel communications, such as cellular communications, SRWCs, and/or hardwired connections.

The vehicle lidar communication system 100 includes the lidar unit 40 and the onboard computer 60. The vehicle lidar communication system 100 can also include the wireless communications device 30 and memory 66. In general, the onboard computer 60 obtains, processes, and then sends data to the lidar unit via the communications bus 58. In many instances, this data that is processed by the onboard computer 60 is data that is to be communicated to the external lidar communication system 110 via the vehicle lidar emitter 42 of the lidar unit 40. In some embodiments, the onboard computer 60 receives data from the lidar unit 40, and this data can be received at the lidar unit 40 from the external lidar communication device 90 via the download lidar communications channel 104.

The onboard computer 60 is a computer or other computing device that includes a processor and memory. The processor can be any suitable processor, such as those discussed with respect to processor 36 of the wireless communications device 30. Also, the memory 66 can be any type of memory, such as those discussed with respect to memory 38 of the wireless communications device 30. The memory 66 can hold various vehicle information, including vehicle operation information. The vehicle operation information includes sensor information and/or other vehicle telemetry information. The onboard computer 60 includes a data communication controller 62 and a data receiver 64. In many embodiments, the data communication controller 62 is used when the lidar unit 40 is in a data communication mode and is deactivated when the lidar unit 40 is in the object detection mode. The data communication controller 62 and the data receiver 64 are depicted as being separate from one another, but, at least in some embodiments, these elements can be incorporated with one another. Moreover, in one embodiment, the data communication controller 62 and/or the data receiver 64 can be implemented through computer instructions that are stored in memory (e.g., memory 66 or memory of onboard computer 60) and that are executable by the processor of the onboard computer 60.

In many embodiments, the data communication controller 62 is used to control the mode of operation of the lidar unit 40, as well as to provide prepared data to the lidar unit 40 that is to be communicated to the external lidar communication device 90. The lidar unit 40 can operate in an object detection mode and a data communication mode. In many embodiments, the lidar unit 40 operates in only one of these modes at any given time. The data communication controller 62 can send a message to the lidar unit 40 instructing the lidar unit 40 to operate in a particular mode. For example, the data communication controller 60 sends a data communication mode command to the lidar unit 40 that instructs the lidar unit 40 to operate in the data communication mode. In another example, the data communication controller 60 sends an object detection mode command to the lidar unit 40 that instructs the lidar unit 40 to operate in the object detection mode. Alternatively, or additionally, the lidar unit 40 can also receive these command messages from other VSMs of the vehicle 12, such as from the wireless communication device 30 or the BCM 24.

As mentioned above, the data communication controller 62 also prepares data that is to be communicated using the lidar unit 40 to the external lidar communication device 90. As used herein, prepared data is data that is in an appropriate form such that the data can be communicated using the lidar emitter 42 of the lidar unit 40. The prepared data can be encoded data and, in such cases, the data communication controller 62 functions as a digital data encoder and controller. In one embodiment, the prepared data can be information conveying how the data is to be modulated by the lidar unit 40, which is data that has been encoded or otherwise incorporated into a suitable format for emission by the lidar emitter 42. For example, the prepared data can include data representing a sequence of light pulses (including their pulse width, interval length/timing) that can be input into a lidar pulse controller 48 of the lidar unit 40, which can then use the lidar emitter 42 to emit light pulses in accordance with the modulated data. In another example, the prepared data can include data that is modulated over a light wave (or electromagnetic radiation) using frequency modulation techniques or amplitude modulation techniques. In such a case, the data communication controller 62 can inform the lidar unit 40 (e.g., the lidar pulse controller 48) as to how the data shall be modulated. In one embodiment, the data communication controller 62 obtains vehicle data from the memory 66 and prepares the data to obtain prepared data. The prepared data can be represented in a digital form (e.g., by a combination of bits) and communicated to the lidar unit 40 via the communications bus 58.

In some embodiments, the onboard computer 60 includes the data receiver 64. The data receiver 64 receives data from the lidar unit 40. The data received at the data receiver 64 is data that is received or sensed by the lidar unit 40, such as spatial information obtained during the object detection mode and data received from the external lidar communication device 90 via the download lidar communication channel 104. The data received at the data receiver 64 can be represented in digital form (as sampled or otherwise encoded by the lidar unit 40). The data receiver 64 can include a decoder or other components (or computer instructions) that are operable to convert the received data into a suitable format for use by the vehicle. This decoded data can then be sent to the data communication controller 62 and/or other VSMs of the vehicle 12. In at least some embodiments where the lidar download channel 104 is not used, the data receiver 64 can be turned off when the lidar unit 40 is in the data communication mode. The data receiver 64 is turned on or active when the lidar unit 40 is in the object detection mode, or when the lidar download channel 104 is being used (or capable of being used and when the lidar unit 40 is in the data communication mode).

The lidar unit 40, which was briefly described above, includes a lidar emitter 42 (sometimes referred to as a vehicle lidar emitter 42), a lidar receiver 44 (sometimes referred to as a vehicle lidar receiver 44), scan configuration settings 46, and a lidar pulse controller 48. The lidar emitter 42 is an electromagnetic emitter that emits laser light pulses. The laser light pulses can be ultraviolet, visible, or infrared (e.g., near infrared) light. In other embodiments, the lidar emitter 42 can emit other types of electromagnetic radiation. The emitter can include a laser that generates laser light that then passes through one or more optical devices and/or reflects off of one or more mirrors (e.g., tilting mirrors). The lidar unit 40 can use a nodding mirror system, although other mirror and/or optical systems can be used as well. One or more mirrors (e.g., tilting mirrors) can be moved or angled using an electromechanical motor, such as a servo motor. These motors can be controlled by the lidar pulse controller 48 or other controller of the lidar unit 40. The lidar receiver 44 is a light sensor or detector that detects the presence of light. The lidar receiver 44 can include a photodetector. The lidar receiver 44 can also include any suitable optics and/or other components. The lidar receiver 44 can also convert the detected light into digital data that can then be sent to the data receiver 64 of the onboard computer 60 or to another VSM of the vehicle 12. In at least one embodiment, the lidar receiver 44 is "on" or listening at times when the vehicle lidar communication system 100 is in the object detection mode and at times when the vehicle lidar communication system 100 is in the data communication mode.

The scan configuration settings 46 define the scanning mode that is used by the lidar. In one embodiment, the scan configuration settings 46 define the present scanning mode that is presently being used by the lidar unit 40. Or, the scan configuration settings 46 define the properties of one or more scanning modes, any of which can be used by the lidar unit 40. The scan configuration settings 46 can also include a default scanning mode, which may be a full field of view mode (or scanning mode). In one embodiment, the scan configuration settings 46 can be embodied in data that is stored at the lidar unit 40. The lidar pulse controller 48 controls the emission of laser light pulses, including instructing the lidar emitter 42 when to emit light, as well as provides instructions to other properties regarding the laser light emission. Such properties can include the pulse width or pulse length, the frequency or sequence of laser light pulses, the intensity of laser light pulses, the frequency or wavelength of laser light pulses, etc. In at least one embodiment, the lidar pulse controller 48 sends a laser light emission message instructing the lidar emitter 42 to emit a laser light pulse (or a plurality of laser light pulses). For example, the lidar pulse controller 48 sends laser light emission messages in accordance with modulated or otherwise prepared data that is received from the data communication controller 62 of the onboard computer 60. The lidar pulse controller 48 can be embodied in a computer module that is stored in memory and executable by a processor of the lidar unit 40, or the lidar pulse controller 48 can be an integrated circuit (e.g., an application-specific integrated circuit (ASIC)). Other implementations of the lidar pulse controller 48 can be used as well. In one embodiment, the default mode of operation for the light pulse controller 48 is the object detection mode, where the light pulse controller 48 controls the lidar emitter 42 such that the lidar unit 40 performs a scan of the lidar's field of view. When the light pulse controller 48 operates in the data communication mode, the light pulse controller 48 can modulate the prepared data over the light pulses, which can be carried out through the light pulse controller 48 causing the lidar emitter 42 to emit the modulated data.

The external lidar communication system 110 includes an external lidar communication device 90. The external lidar communication device 90 includes a lidar emitter 92 (sometimes referred to as an external lidar emitter 92), a lidar receiver 94 (sometimes referred to as an external lidar receiver 94), and a data receiver circuit 96. In other embodiments, the external lidar communication system 110 does not include a lidar emitter 92, but includes a secondary communication device 98, which can be a SRWC circuit or a cellular chipset. Also, in some embodiments, including the illustrated embodiment, the external lidar communications device 90 includes both the external lidar emitter 92 and the secondary communications device 98.

In one embodiment, the external lidar emitter 92 can be the same or similar to the vehicle lidar emitter 42 of the lidar unit 40. The external lidar emitter 92 can include tilting mirror(s) and, in one scenario, the external lidar emitter 92 can use the tilting mirror(s) to direct laser light pulses at a particular angle. In other embodiments, the external lidar emitter 92 does not include tilting mirrors. Also, the external lidar receiver 94 can be the same or similar to the vehicle lidar receiver 44 of the lidar unit 40. However, in some embodiments, including the illustrated embodiment, the external lidar receiver 94 includes a larger aperture for the detection of light. This larger aperture can be useful when the vehicle is transmitting data using the lidar unit 40 over the upload lidar communications channel 102. In many scenarios, the vehicle lidar emitter 42 emits light pulses in a single direction (i.e., fixed vector), and these light pulses can have a small diameter. Thus, at least in some embodiments, to receive or detect the light emitted from the vehicle lidar emitter 42, the light pulses need to pass through the aperture of the external lidar receiver 94. Thus, misalignment between the lidar unit 40 and the external lidar communications device 90 can result in a failure of the external lidar receiver 94 to detect light from the vehicle lidar emitter 42. This larger aperture of the external lidar receiver 94 enables the receiver 94 to receive light pulses from the vehicle lidar emitter 42 under conditions in which there is a larger margin of misalignment between the lidar unit 40 and the external lidar communications device 90.

The data receiver circuit 96 is a circuit that can be used to sample the data that is received at the external lidar receiver 94 via the upload lidar communication channel 102. The data receiver circuit 96 can be an ASIC or other circuitry or electrical components. In some embodiments, the data receiver circuit 96 demodulates data that is received from the external lidar receiver 94. And, in some embodiments, the data receiver circuit 96 can also prepare data for transmission over the download lidar communication channel 104. For example, the data receiver circuit 96 modulates data (similar or in the same way as the data communication controller 62) and then sends the data to the lidar emitter.

The secondary communication device 98 is a communications device that does not use lidar for data communications. In the illustrated embodiment, the secondary communication device 98 is depicted as a wireless device with an antenna 99; however, in other embodiments, the secondary communication device 98 can be a hardwired device that is connected to the land network, or that is connected to other remote-network-facing devices (e.g., Internet-connected devices). In one embodiment, the secondary communication device 98 includes a cellular chipset that can be used for long range radio communications, for example. In another embodiment, the secondary communication device 98 includes a short-range wireless communications (SRWC) circuit that can be used to carry out SRWC with other SRWC devices, such as the wireless communications device 30 of the vehicle 12 or a wireless access point (WAP) (e.g., hotspot). The secondary communication device 98 is used to carry out backchannel communications with the vehicle and, in at least one embodiment, the external lidar communications device 90 sends data acknowledgment messages that indicate that data was received at the external lidar communications device 90. These data acknowledgment messages can include a time indicator, a data packet identifier, an external lidar communication device identifier, as well as various other information.

Figure 3:
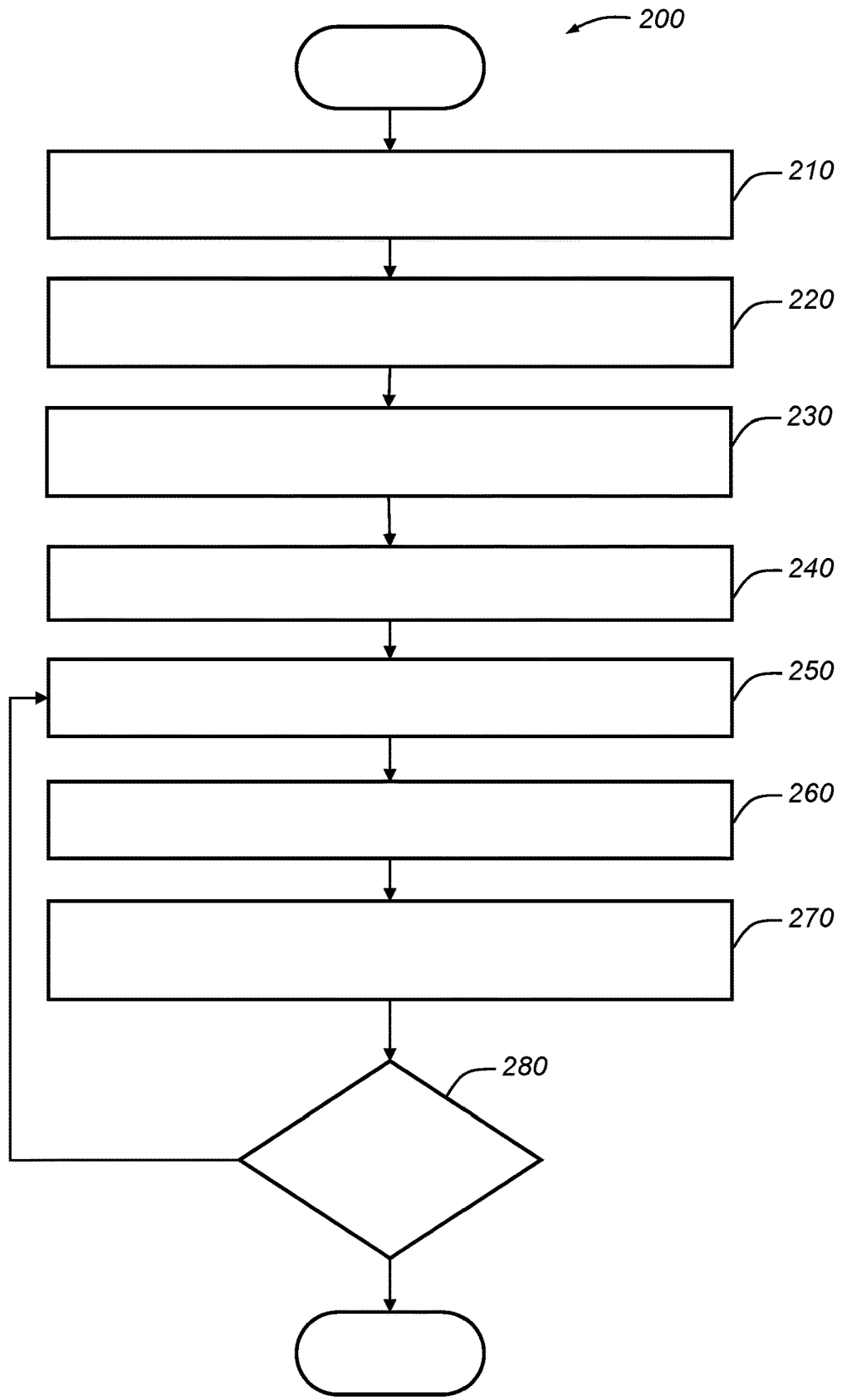
FIG. 3 is a flowchart of an embodiment of a method of communicating data using lidar.

With reference to FIG. 3, there is shown an embodiment of a method 200 of communicating data using lidar. In at least one embodiment, the method 200 is carried out by the vehicle lidar communication system 100. Although the steps of the method 200 are described as being carried out in a particular order, it is hereby contemplated that the steps of the method 200 can be carried out in any suitable or technically feasible order as will be appreciated by those skilled in the art.

In step 210, the lidar unit operates in an object detection mode. The object detection mode is a mode of the lidar unit in which the lidar unit scans an area within the lidar's field of view through emitting a plurality of light pulses over the entire field of view. In many embodiments, the object detection mode is carried out in conjunction with a scanning mode of the lidar unit (as represented/defined in the scan configuration settings), as discussed above. The lidar unit 40, when operating under the object detection mode, emits a plurality of laser light pulses using the vehicle laser emitter 42. In many embodiments, the laser light pulses are emitted at varying azimuth and elevation angles, and the laser light pulses are emitted in a particular direction using one or more tilting mirrors. The vehicle lidar receiver 94 receives reflections of the laser light pulses using, for example, a photodetector. The received reflections are then encoded in digital data that is used to construct an image of the lidar's field of view. This step can be carried out by the data receiver 64, the lidar unit 40, or another VSM of the vehicle 12. This lidar image can be sent to various other VSMs of the vehicle and used for various purposes, such as for autonomous driving.

In many embodiments, the lidar unit 40 operates in the object detection mode until an indication is received instructing the lidar unit 40 to switch modes from the object detection mode to the data communication mode. The indication can be generated by any of the various VSMs of the vehicle 12, and can be received at the data communication controller 62. The indication can be generated upon a trigger. Various types of triggers can be used, such as a vehicle operation trigger, a vehicle location trigger, an externally-received trigger, etc. The vehicle operation trigger is triggered upon the occurrence of a particular vehicle state concerning one or more VSMs of the vehicle 12. The vehicle location trigger is triggered when the vehicle reaches some predefined location. For example, the GNSS receiver 22 can receive GNSS signals and determine the location of the vehicle 12. The vehicle's present location can then be compared with a predetermined location (or other location-related parameters) to determine whether the vehicle is located at the predetermined location. The externally-received trigger is triggered when certain information is received at the vehicle, such as a lidar communication request that is received via backchannel communications or at the vehicle lidar receiver 44 via the download lidar communication channel 104. For example, a SRWC device can be detected by the wireless communications device 30 and, based on information in a SRWC message (e.g., a service set identifier (SSID)), the vehicle 12 may determine to activate the data communication mode (step 220).

In one embodiment, the vehicle lidar communication system 100 can detect the presence of an external lidar communication device (e.g., device 90) through one or more onboard vehicle sensors. The vehicle may scan or otherwise attempt to detect the external lidar communication device 90 once the trigger has been triggered. For example, once the trigger has been triggered, the lidar unit 40 can scan an area in front of the vehicle 12 to obtain light and spatial information regarding the area in front of the vehicle 12. This information can be processed, such as by the data receiver 64 and/or other modules of the onboard computer 60 (or another VSM) to detect the presence of the external lidar communication device 90. The external lidar communication device 90 can have an indicator, such as a bar code, a light emitting diode (LED), a reflector, or other article that indicates the presence of the external lidar communication device 90 to the vehicle lidar communication system 100. Once the vehicle lidar communication system 100 detects the presence of the external lidar communication device 90, the vehicle lidar communication system 100 can determine the location (e.g., the range, azimuth angle, and/or elevation angle) of the external lidar communication device 90 relative to the vehicle lidar communication system 100. Then, in step 230, the location of the external lidar communication device 90 can be used to direct the fixed vector laser light pulses at the external lidar receiver 94 of the external lidar communication device 90.

In other embodiments, the lidar unit 40 only directs the laser pulses straight out of the lidar emitter 42 and, thus, the vehicle 12 can determine whether the vehicle lidar emitter 42 is aligned with the external lidar receiver 94 of the external lidar communications device 90. Once the vehicle 12 determines to switch to the data communication mode, the method 200 continues to step 220.

In step 220, the data communication mode is activated. The data communication mode is a mode of the vehicle lidar communication system 100 where the lidar unit 40 is configured such that the lidar unit 40 can communicate data over the upload lidar communication channel 102. In one embodiment, activation of the data communication mode includes changing the scan configuration of the lidar unit 40 to a fixed vector mode. The fixed vector mode is a mode in which the lidar unit 40 emits light pulses in a fixed direction and/or at a fixed angle. For example, in one embodiment, the data communication controller 62 sends a signal to the lidar pulse controller 48 of the lidar unit 40 and instructs the lidar unit 40 to switch the scan configuration to the fixed vector mode. Additionally, the lidar unit 40 can be instructed (e.g., via a message) by the data communication controller 62 to operate in the data communication mode. This message can be the same or separate as the message instructing the lidar unit 40 to switch the scan configuration settings 66 to the fixed vector mode. The method 200 continues to step 230.

In step 230, a data connection request is sent from the vehicle lidar communication system to the external lidar communication device. The data connection request can include an identifier of the vehicle 12, an identifier of the vehicle lidar communication system 100 (e.g., an identifier of the lidar unit 40), a timestamp, a location (e.g., the angle between the lidar unit 40 and the external lidar communication device 90, a geographical location of the vehicle 12), authentication or authorization information (e.g., username or password, certificate), or other information pertaining to the vehicle 12 or the vehicle lidar communication system 100. The data connection request can be sent using the lidar unit 40 or may be sent using backchannel communications. In one embodiment, the data communication controller 62 sends prepared data to the lidar unit 40. The lidar emitter 42 emits laser light in accordance with the prepared data. The laser light is detected by the external lidar receiver 94 and then sent to the data receiver circuit 96 of the external lidar communication device 90. In another embodiment, backchannel communications are used. For example, the wireless communications device 30 of the vehicle 12 and the secondary communication device 98 of the external lidar communication device 90 can establish a SRWC connection, such as a Wi-Fi connection or a BLE connection. In other embodiments, the vehicle 12 can send the data connection request to the external lidar communication device 90 via use of wireless carrier system 70 (e.g., a cellular carrier system), or via the remote facility 80 (or other remote server). Also, in other embodiments, the external lidar communication device 90 can send the data connection request to the vehicle lidar communication system 100 via lidar communications or backchannel communications, such as through using any of those communication paths described above.

In many embodiments, once the data connection request is received by the external lidar communication device 90, a handshake or other data connection security mechanism can be carried out. For example, a four-way handshake similar to those used for SRWC communications can be carried out to establish a shared secret (or other security code(s)) that can be used to encrypt data communications that are to be sent over the communication channel(s) 102 and/or 104. This shared secret can also be used to encrypt backchannel communications as well, or a separate encryption/security technique and/or separate security codes can be used for these backchannel communications. Once the external lidar communication device 90 and the vehicle lidar communication system 100 complete the handshake or other data connection security process, the connection can said to be securely established.

The lidar unit 40 transmits data (e.g., step 260) using the fixed vector mode. The diameter of the laser light is quite small and, in many embodiments, a direct line of sight between the vehicle lidar emitter 42 and the external lidar receiver 94 is required. The direct line of sight refers to a direct line in space. The fact that a direct line of sight is necessary (in some embodiments) to receive the laser light pulses (and, thus, the data) causes the lidar communication process to be inherently secure in that an attacker would need to position their malicious device within the direct line of sight, which is typically of a line of a small diameter. The method 200 continues to step 240.

In step 240, a data request is sent to the vehicle lidar communication system 100. The data request can include an indication to provide data to the external lidar communication device 90, the remote facility 80, or other external device. In one embodiment, the data request is sent from the remote facility 80. For example, the data request can be generated and then sent from the remote facility 80 to the vehicle 12 via the land network 76 and/or the wireless carrier system 70. Additionally, in some embodiments, the remote facility 80 can also inform the external lidar communication system 110 of the data request or that the vehicle 12 may soon be communicating information to the external lidar communication system 110 using lidar. In another embodiment, the data request can be sent to the external lidar communication system 110 and then sent to the vehicle 12 via the download lidar communication channel 104. The data request can specify a type, amount (e.g., size), or a particular set of data to be communicated from the vehicle to the external lidar communication device 90 (or the remote facility 80). Data that is sent from the vehicle to one or more other external systems (e.g., the remote facility 80 and/or the external lidar communication device) is referred to as a data upload. Data that is sent to the vehicle from one or more other external systems (e.g., the remote facility 80 and/or the external lidar communication device) is referred to as a data download.

In another embodiment, the vehicle lidar communication system 100 downloads data from the external lidar communication device 90. In this embodiment, the vehicle lidar communication system 100 can send a data request to the external lidar communication device 90 or to the remote facility 80. Or, the remote facility 80 can send a data request to the external lidar communication device 90 instructing the device to send data to the vehicle 12. The requested data can be an over-the-air (OTA) update, media, or other information. The requested data can be stored at the databases 84 of the remote facility 80. The method 200 continues to step 250.

In step 250, the requested data is prepared and sent to the lidar unit. In many embodiments in which a data upload is being carried out, the data communication controller 62 can receive data from memory 66 or other memory device of the vehicle 12. The data communication controller 62 then prepares the data, which can include modulating the data or otherwise preparing digital data that can be received at the lidar unit 40 and used to emit light pulses (or other electromagnetic radiation) so as to convey the data. For example, the data can be modulated over a carrier signal using frequency modulation or amplitude modulation techniques. As another example, the prepared data can represent a sequence of laser light pulses that are to be emitted from the lidar 40. This prepared data can specify the timing between laser light pulses, the pulse width of the light pulses, and/or other attributes that can be varied so as to convey the data. The data communication controller 62 can also encrypt the data before preparing the data. Once the data is prepared, the prepared data is sent to the lidar unit 40.

As mentioned above, in other embodiments, a data download can be carried out in which data is downloaded to the vehicle using the download lidar communications channel 104. The external lidar communication device 90 can prepare data to be sent by the external lidar emitter 92 in a like manner as that described above with respect to the vehicle lidar communication system 100. In such embodiments, the external lidar communication device 90 can include a data communication controller or a module that performs like functions. The method 200 continues to step 260.

In step 260, the prepared data is emitted using the lidar unit. In many embodiments, the light pulse controller 48 controls the lidar emitter 42 in accordance with the prepared data. For example, the light pulse controller 48 instructs or otherwise causes the lidar emitter 42 to emit light pulses according to the specified sequence (e.g., as specified according to the prepared data), which can result in the vehicle lidar emitter 42 emitting light pulses of varying pulse width and/or at various times (e.g., with varying intervals between the light pulses). In other embodiments, the data is modulated over a carrier signal (as instructed by or as represented by the prepared data) and then emitted using the vehicle lidar emitter 42. In the case of a data download, the external lidar communication device 90 can carry out the emitting step in a like manner as that which is described above with respect to the vehicle lidar communication system 100. The method 200 continues to step 270.

In step 270, a data receipt acknowledgment message is received. The data receipt acknowledgment message can be an indication that data was received. The data receipt acknowledgment message can specify the amount of data received, a data package indicator of a data package that was received, a type of data received, and/or a checksum or other integrity data concerning the data received. As mentioned above, in some embodiments, only a single lidar communication channel 102 (or only a download lidar communication channel) is used for lidar communications. In such a case, the data receipt acknowledgment message is sent from the external lidar communications device 90 to the vehicle lidar communication system 100 via backchannel communications. However, in other embodiments, the lidar download communication channel 104 is used to communicate information from the external lidar communication device 90 to the lidar unit 40. In such embodiments, the data receipt acknowledgment message can be communicated to the vehicle lidar communication system 100 via this channel 104. The method 200 continues to step 280.

In step 280, it is determined whether all data has been transmitted. This determination can be made by the vehicle lidar communication system 100 and, in some embodiments, by the data communication controller 62 of the onboard computer 60. This determination can be made based on one or more messages received from the external lidar communication device 90, the remote facility 80, another VSM of the vehicle 12, or another device. The message can specify that all data has been received or that no more data is to be communicated. In one embodiment, the determination can be based on whether any outstanding or unfulfilled data requests have been received at the vehicle lidar communication system 100. When it is determined that more data is to be communicated by the lidar unit 40, then the method 200 can proceed back to step 250; otherwise, the method 200 ends.

Figure 4:
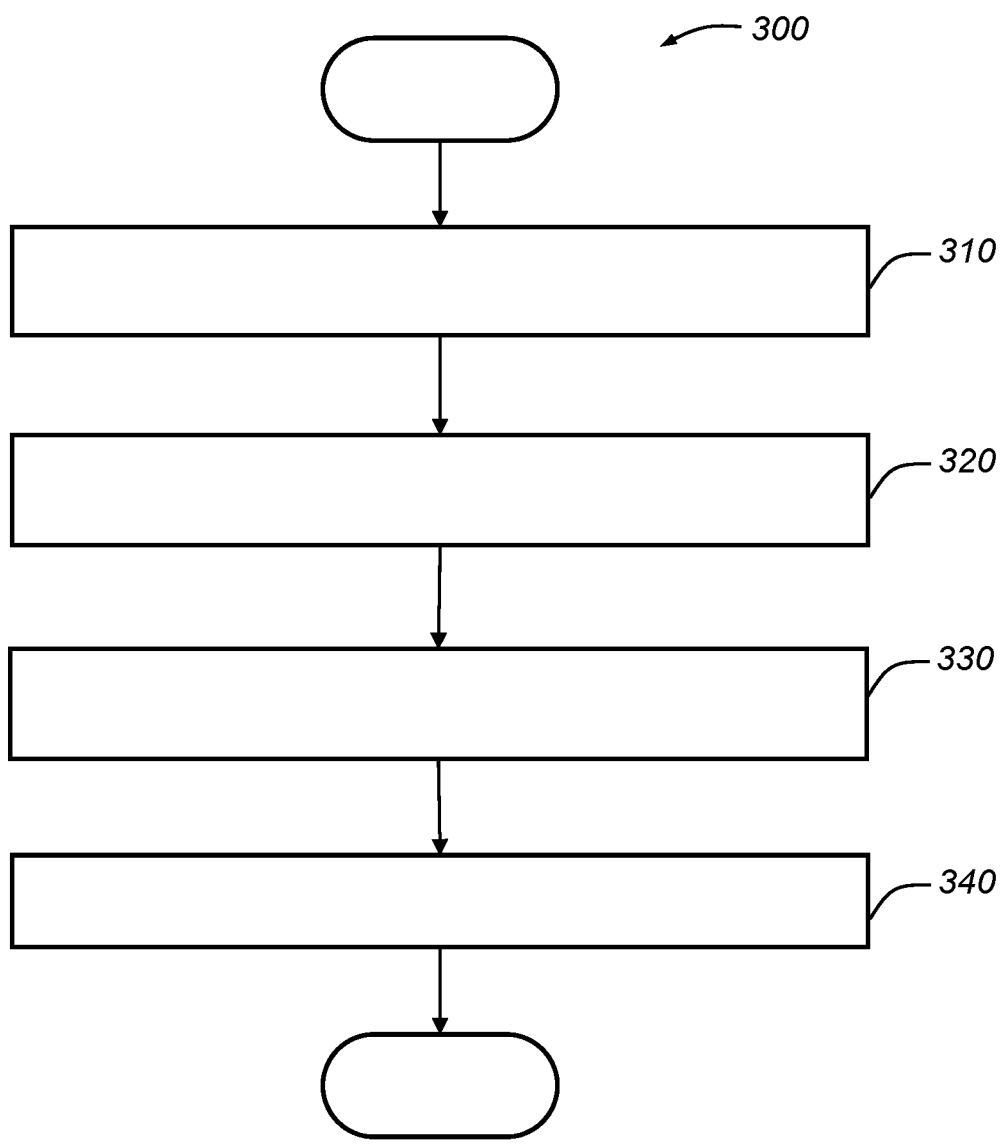
FIG. 4 is a flowchart of another embodiment of a method of communicating data using lidar.

With reference to FIG. 4, there is shown another embodiment of a method 300 of communicating data using lidar. The method 300 can be carried out by the vehicle lidar communication system 100. Although the steps of the method 300 are described as being carried out in a particular order, it is hereby contemplated that the steps of the method 300 can be carried out in any suitable or technically feasible order as will be appreciated by those skilled in the art.

In step 310, the lidar unit operates in an object detection mode. This step is analogous to step 210 of the method 200 (FIG. 3) discussed above. For example, the lidar unit 40 can operate in the object detection mode using a scanning mode as the scan configuration. This mode can be carried out while the vehicle 12 is in the powered on mode and used for autonomous vehicle driving operations, for example. The method 300 continues to step 320.

In step 320, an emergency event is detected. An emergency event is detected when the vehicle 12 determines that contact with a remote or external system should be made to address imminent or immediate harm or damage, or to address potential imminent or immediate harm or damage. For example, the vehicle 12 may detect a collision through use of one or more collision sensors (e.g., accelerometers). In another scenario, the vehicle 12 may "break down" such that the vehicle is not drivable (or not safely drivable)—this can be detectable through use of onboard vehicle sensors. And, in yet another scenario, the vehicle 12 determines that an occupant of the vehicle is having a health problem, such as a heart attack. In such cases, the vehicle can immediately continue to step 330 and set the lidar unit to an emergency broadcast mode, at least in some embodiments. In other embodiments, the vehicle 12 can first attempt to make contact with a remote facility or an emergency system through use of the wireless communications device 30 using SRWC and/or cellular communications. If such contact fails or is experiencing latency issues, the method 300 can continue to step 330. In some scenarios, the wireless communications device 30 may be dysfunctional due to a damage caused by a collision and, in such a case, it is desirable to use other communication means to send out an emergency message. In other embodiments, the vehicle 12 can attempt to make contact using both the lidar unit operating in the emergency broadcast mode and through use of other communications, such as through backchannel communications.

In step 330, the lidar unit is set to an emergency broadcast mode. The emergency broadcast mode is a mode in which lidar is used to broadcast a message that is intended to be received by a lidar receiver. The emergency broadcast mode is a type of a data communication mode. When in the emergency broadcast mode, the lidar unit 40 can use a slow scan mode as the scan configuration setting. The slow scan mode is a scanning mode in which the rate at which the lidar unit 40 "scans" or emits light lidar pulses over the field of view is slower than when the lidar unit 40 is in the object detection mode. In one embodiment, the slow scan mode scans at about 50% the speed of the default scan mode (or object detection mode). In another embodiment, the slow scan mode scans at about 10% the speed of the default scan mode (or object detection mode). The method 300 continues to step 340.

In step 340, an emergency message is emitted using the lidar unit. The emergency message can be a message or data that is prepared by the data communication controller 62 and that is sent to the lidar pulse controller 48 via the communications bus 58. The emergency message can include a vehicle identifier, data indicating that the vehicle or its occupants are in distress, a remote server address (e.g., IP address, domain name and/or address), a type of emergency, a vehicle location (e.g., as determined using the GNSS receiver 22), and/or various other data. The emergency message can be modulated over a carrier signal by the lidar pulse controller 48. In one embodiment, a predefined emergency light pulse (or series of light pulses) can be defined by the remote facility 80. This can facilitate detection of the emergency message since other lidar systems can always be comparing received lidar signals to determine if they match the predefined emergency light pulse(s).

In many embodiments, the emergency message is intended as being received by another lidar communication system, such as a vehicle lidar communication system or an external lidar communication system. These other lidar systems can always be listening for a particular message, or a particular frequency, amplitude, wavelength, pulse sequence, or other lidar light property that indicates that the vehicle desires to make contact with a remote system, or that the vehicle (or its occupants) are in distress. Once the other lidar system (e.g., another vehicle) receives the emergency message, the other lidar system can forward the emergency message to a remote server (e.g., remote facility 80). In one embodiment, the other lidar system can send the emergency message to an address (e.g., IP address, other computer network address) specified in the emergency message. The other lidar system can be analogous to the vehicle lidar communication system 100 or the external lidar communication system 110. The method 300 then ends.

In an alternative embodiment of the method 300, after step 340, an acknowledgment message is received indicating that the emergency message was received. In one embodiment, the other lidar system that received the emergency message can send the acknowledgment message to the vehicle lidar communication system 100 using a download lidar communication channel similar to the channel 104. The responding lidar system (i.e., the lidar system that received the emergency message) can forward the emergency message to a remote server (e.g., remote facility 80, computer 78) (step 340) and, then, can receive a response from the remote server. The response can then be communicated back to the vehicle lidar communication system 100 via a download lidar communication channel or through use of backchannel communications. In other embodiments, the remote server can attempt to respond directly to the vehicle 12 using backchannel communications. In one embodiment, the vehicle lidar communication system 100 can continuously emit the emergency message until the acknowledgment message is received. It should be appreciated that the method 300 can also be carried out by the external lidar communication system 110, in some embodiments.

In one embodiment, the method 200, the method 300, and/or parts thereof can be implemented in one or more computer programs (or "applications", or "scripts") embodied in a computer readable medium and including instructions usable (e.g., executable) by one or more processors of the one or more computers of one or more systems. The computer program(s) may include one or more software programs comprised of program instructions in source code, object code, executable code, or other formats. In one embodiment, any one or more of the computer program(s) can include one or more firmware programs and/or hardware description language (HDL) files. Furthermore, the computer program(s) can each be associated with any program related data and, in some embodiments, the computer program(s) can be packaged with the program related data. The program related data may include data structures, look-up tables, configuration files, certificates, or other relevant data represented in any other suitable format. The program instructions may include program modules, routines, programs, functions, procedures, methods, objects, components, and/or the like. The computer program(s) can be executed on one or more computers (or VSMs), such as on multiple computers (or VSMs) that are in communication with one another.

The computer program(s) can be embodied on computer readable media (e.g., memory 66, other memory of the vehicle lidar communication system 100, memory 38 of the wireless communications device 30, memory of the external lidar communication system 110), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of communicating data using light detection and ranging (lidar), the method being carried out by a lidar communication system, the method comprising:
    activating a data communication mode of a lidar unit including changing a type of emission of the lidar unit from (a) a scan mode including the lidar unit outputting light pulses over a field of view of the lidar unit to (b) a fixed vector mode including the lidar unit outputting light pulses in only a single direction from the lidar unit, wherein the single direction is a direction of an aperture of an external lidar communication device;
    preparing data for communication by the lidar unit to the external lidar communication device in the fixed vector mode;
    after activating the data communication mode and transitioning to the fixed vector mode, communicating the prepared data to the external lidar communication device by emitting light pulses only in the single direction using the lidar unit; and
    receiving an acknowledgment message from the external lidar communication device via backchannel communication, wherein the acknowledgment message indicates receipt of the prepared data by the external lidar communication device.

2. The method of claim 1, further comprising the step of operating the lidar unit in an object detection mode, wherein the lidar unit, when operating in the object detection mode, emits lidar signals using the scan mode.

3. The method of claim 1, wherein the lidar communication system is a vehicle lidar communication system that is installed into a vehicle as a part of vehicle electronics of the vehicle.

4. The method of claim 3, wherein the preparing step is carried out by a data communication controller, and wherein the prepared data is sent to the lidar unit via a communications bus of the vehicle electronics.

5. The method of claim 1 further comprising changing the type of emission of the lidar from the scan mode to a slow scan mode including outputting light pulses over the field of view of the lidar unit at a slower rate than in the scan mode.

6. The method of claim 5, wherein the external data communication device is another vehicle.

7. The method of claim 1, wherein the lidar unit continuously emits the light pulses in the single direction until the acknowledgment message is received, and wherein the light pulses convey an emergency message.

8. The method of claim 1, wherein the backchannel communication is cellular communication.

9. The method of claim 1, wherein the external lidar communication device also sends the acknowledgment message to the lidar communication system via a download lidar communication channel that is established between a lidar emitter of the external lidar communication device and a lidar receiver of the lidar unit.

10. The method of claim 9, wherein the lidar communication system continuously sends the prepared data using the light pulses until the acknowledgment message is received.

11. A method of communicating data using light detection and ranging (lidar), the method being carried out by a lidar communication system that is installed in a vehicle as a part of vehicle electronics of the vehicle, the method comprising:
operating a lidar unit in an object detection mode;
determining to operate the lidar unit in a data communication mode;
activating the data communication mode of the lidar unit including changing a type of emission of the lidar unit from (a) a scan mode including the lidar unit outputting light pulses over a field of view of the lidar unit to (b) a fixed vector mode including the lidar unit outputting light pulses in only a single direction from the lidar unit, wherein the single direction is a direction of an aperture of an external lidar communication device;
after activating the data communication mode and transitioning to the fixed vector mode, transmitting data from the lidar unit to the external lidar communication device using light pulses output in only the single direction over an upload lidar communication channel; and
receiving an acknowledgment message from the external lidar communication device via backchannel communication, wherein the acknowledgment message indicates receipt of the emitted data by the external lidar communication device.

12. The method of claim 11, wherein the light pulses are modulated by the lidar unit according to the data.

13. The method of claim 12, wherein the light pulses are modulated using at least one of amplitude modulation techniques, pulse modulation techniques, and frequency modulation techniques.

14. The method of claim 11, wherein the upload lidar communication channel is secured using a handshake.

15. The method of claim 14, wherein determining to operate the lidar unit in the data communication mode includes determining to operate the lidar unit in the data communication mode when the vehicle lidar communication system detects the presence of the external lidar communication device by detecting an indicator of the external lidar communication device.

16. A vehicle light detection and ranging (lidar) communication system, comprising:
a processor and memory;
a lidar unit that includes a lidar emitter; and
a data communication controller that is communicatively coupled to the lidar unit;
wherein the memory includes computer instructions that, when executed by the processor, cause the vehicle lidar communication system to:
activate a data communication mode of the lidar unit including changing a type of emission of the lidar unit from (a) a scan mode including the lidar unit outputting light pulses over a field of view of the lidar unit to (b) a fixed vector mode including the lidar unit outputting light pulses in only a single direction from the lidar unit, wherein the single direction is a direction of an aperture of an external lidar communication device;
prepare data for communication by the lidar unit to the external lidar communication device in the fixed vector mode;
after activating the data communication mode and transitioning to the fixed vector mode, communicating the prepared data to the external lidar communication device by emitting light pulses using the lidar emitter in only the single direction; and
receive an acknowledgment message from the external lidar communication device via backchannel communication, wherein the acknowledgment message indicates receipt of the prepared data by the external lidar communication device.

17. The vehicle lidar communication system of claim 16, further comprising a wireless communications device that includes wireless communication circuitry, a processor, and memory.

18. The vehicle lidar communication system of claim 16, wherein the lidar unit includes a lidar pulse controller that controls emission of the light pulses.

19. The vehicle lidar communication system of claim 16, wherein the computer instructions, when executed, further cause the vehicle lidar communication system to direct the light pulses toward the external lidar communication device when emitting the light pulses.

* * * * *